(12) United States Patent
Uri

(10) Patent No.: US 8,651,047 B1
(45) Date of Patent: Feb. 18, 2014

(54) PAINTING SYSTEM AND ACCESSORIES

(76) Inventor: Michaeldavid Uri, Ashland, OR (US)

( * ) Notice: Subject to any disclaimer, the term of this patent is extended or adjusted under 35 U.S.C. 154(b) by 595 days.

(21) Appl. No.: 12/904,905

(22) Filed: Oct. 14, 2010

Related U.S. Application Data

(60) Provisional application No. 61/252,140, filed on Oct. 15, 2009, provisional application No. 61/261,191, filed on Nov. 13, 2009.

(51) Int. Cl.
*B05C 21/00* (2006.01)

(52) U.S. Cl.
USPC .......................................... 118/504; 118/505

(58) Field of Classification Search
USPC ......... 118/504, 505; 15/257.01, 144.1–144.4, 15/235.8, 236.01, 245.1
See application file for complete search history.

(56) References Cited

U.S. PATENT DOCUMENTS

| 2,689,003 | A | | 12/1954 | Bullock |
| 4,258,654 | A | | 3/1981 | Ivankovich |
| 4,280,444 | A | | 7/1981 | Jones |
| 4,663,796 | A | * | 5/1987 | Helling et al. ............... 15/144.2 |
| 4,962,722 | A | | 10/1990 | Thompson |
| 5,103,762 | A | | 4/1992 | Long et al. |
| 5,429,677 | A | | 7/1995 | Brown |
| 6,233,882 | B1 | | 5/2001 | Breaux |
| 6,412,138 | B1 | * | 7/2002 | MacMillan ................. 15/144.2 |
| 2001/0037534 | A1 | | 11/2001 | Bryan |
| 2004/0211016 | A1 | * | 10/2004 | Pyles .............................. 15/114 |
| 2006/0162654 | A1 | * | 7/2006 | Greenway ..................... 118/504 |
| 2007/0071898 | A1 | | 3/2007 | Hollins |
| 2008/0092810 | A1 | | 4/2008 | Kim |
| 2008/0092811 | A1 | | 4/2008 | Kim |
| 2010/0126416 | A1 | | 5/2010 | Gringer |

* cited by examiner

*Primary Examiner* — Laura Edwards
(74) *Attorney, Agent, or Firm* — Jerry Haynes Law

(57) ABSTRACT

A spray shield assembly includes a spray shield handle, a universal joint carried by the spray shield handle and a spray shield carried by the universal joint.

3 Claims, 15 Drawing Sheets

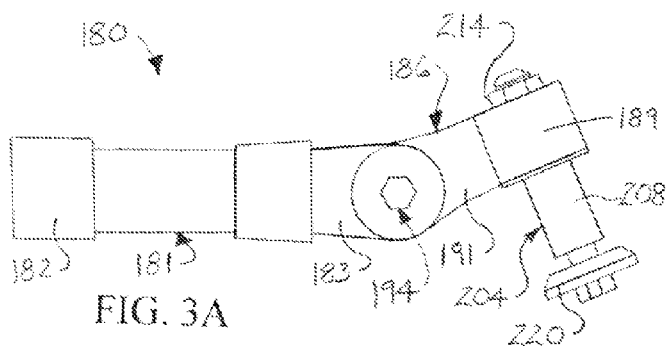
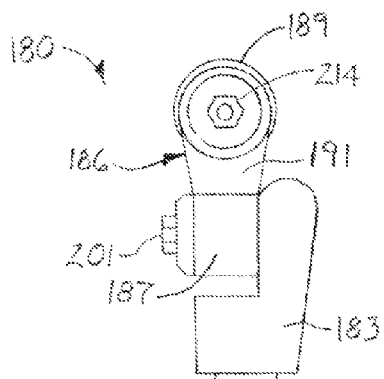
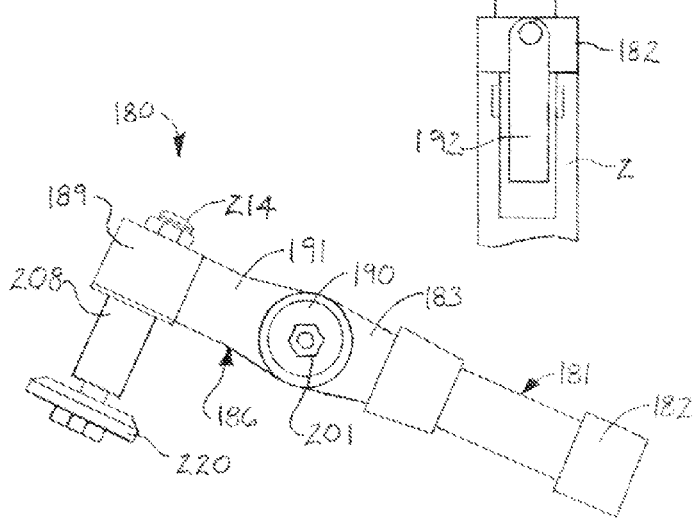
FIG. 3A
FIG. 3B
FIG. 3C

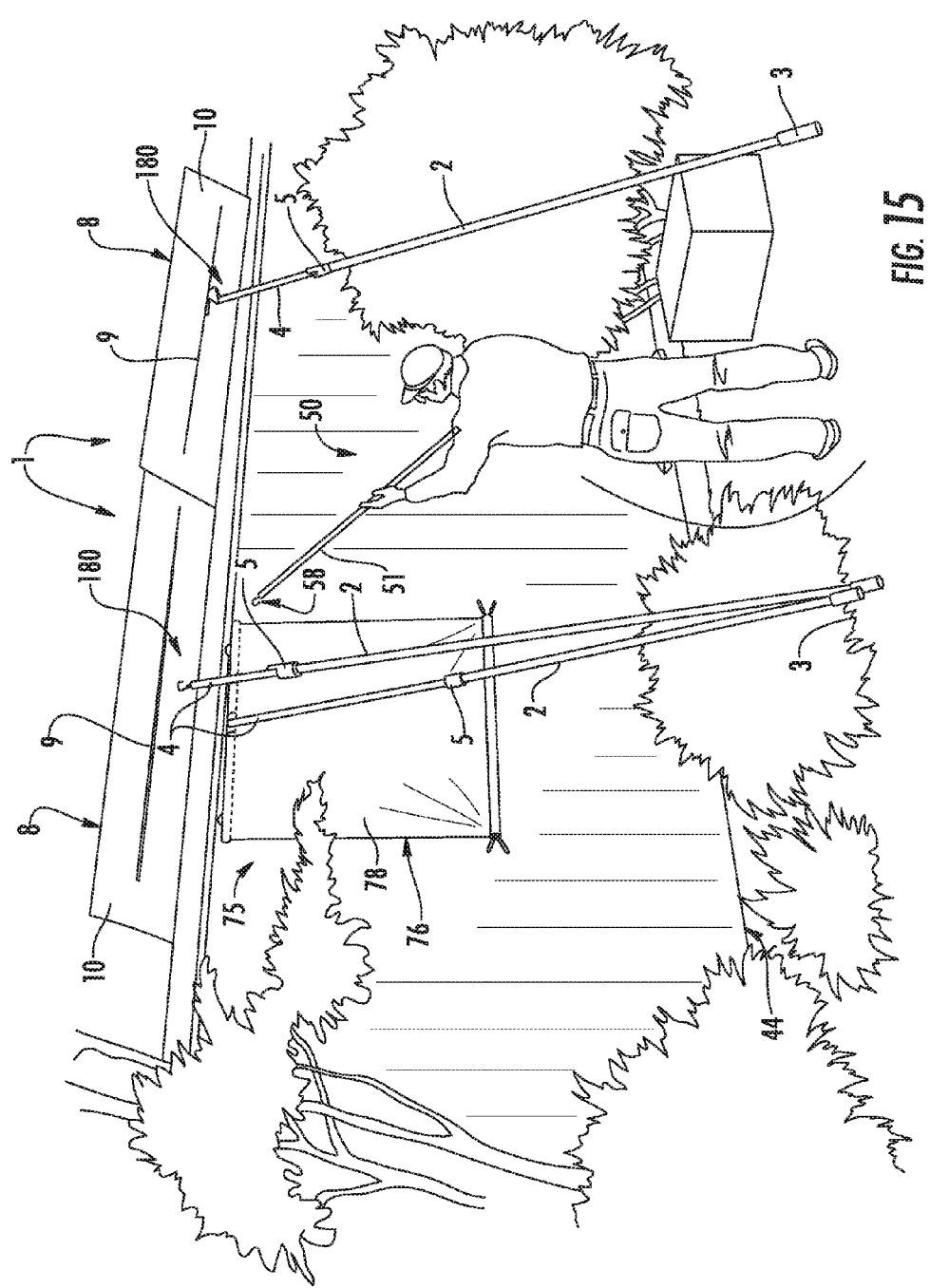

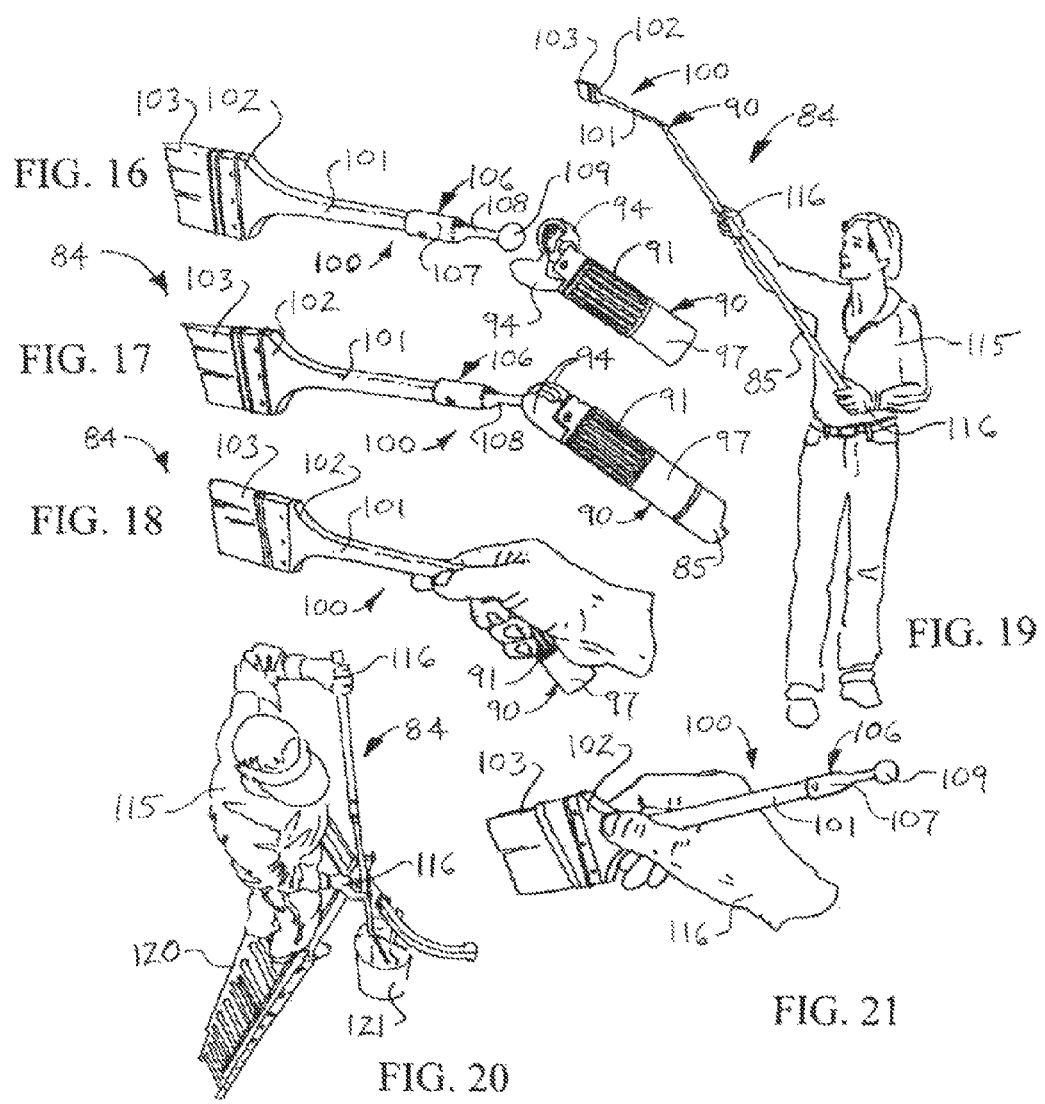

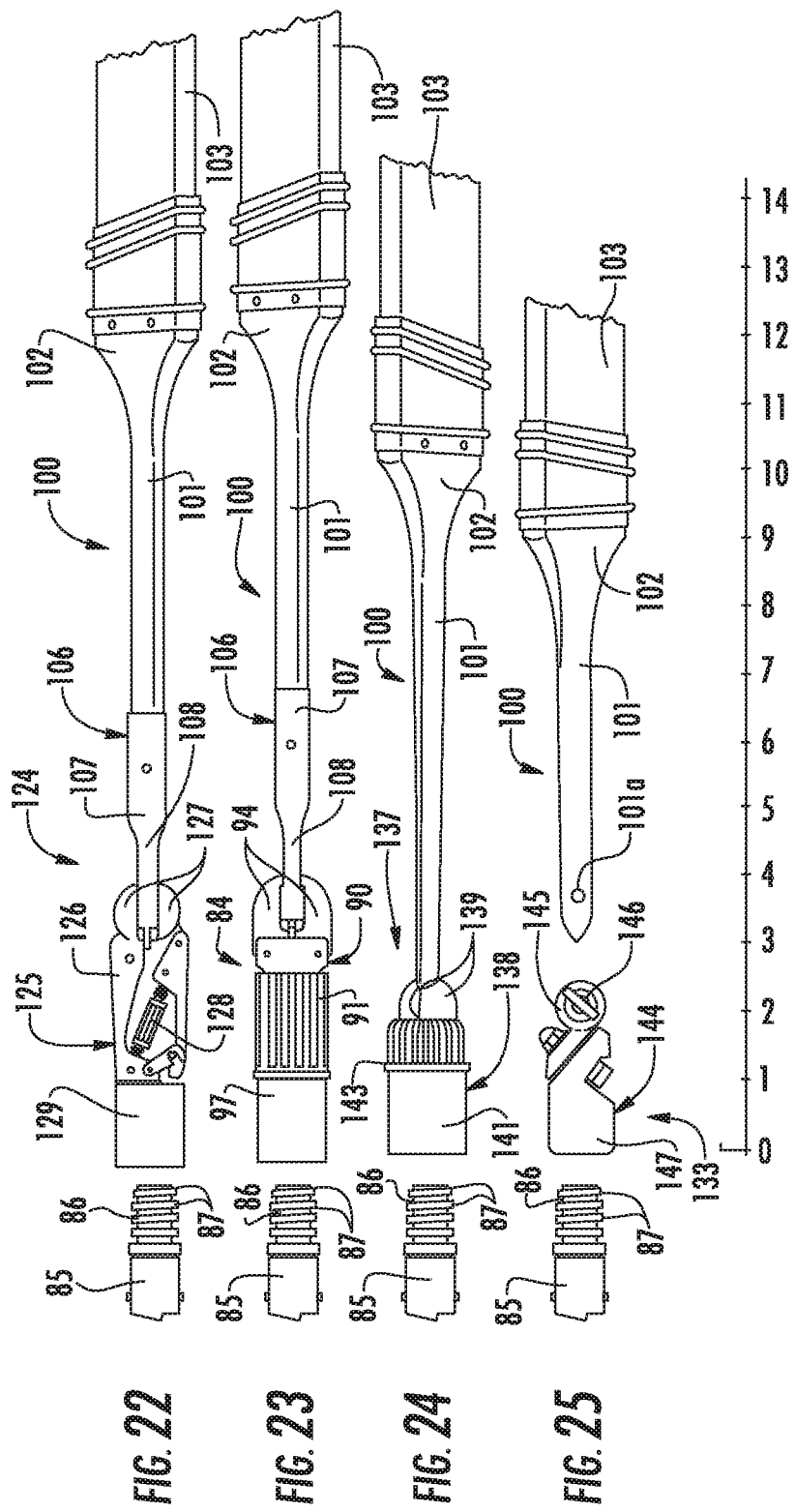

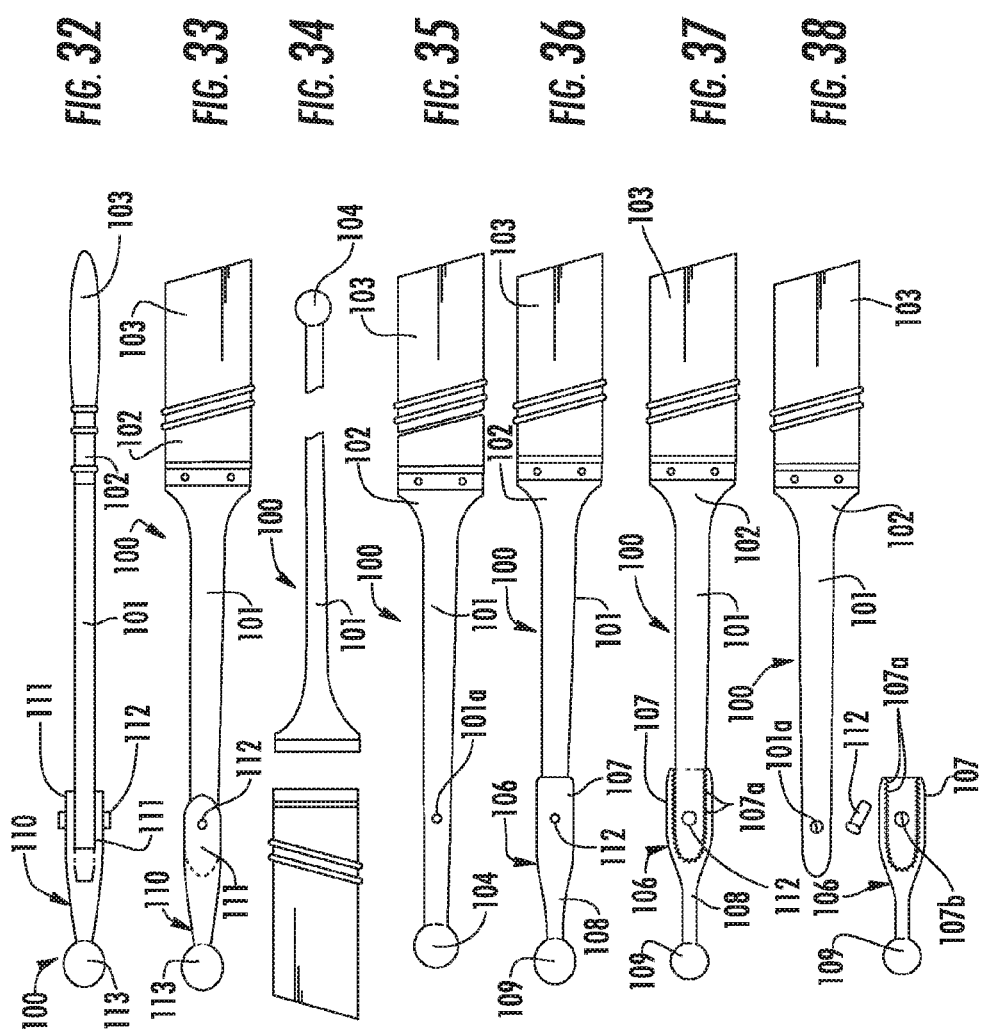

PAINTING SYSTEM AND ACCESSORIES

CROSS-REFERENCE TO RELATED APPLICATIONS

This application claims the benefit of U.S. provisional application No. 61/252,140, filed Oct. 15, 2009 and entitled "Self Standing Spray Shield System and Components" and U.S. provisional application No. 61/261,191, filed Nov. 13, 2009 and entitled "Professional Self Standing Spray Shield System and Components" and hereby incorporates both provisional applications by reference in their entireties.

FIELD OF THE INVENTION

The disclosure generally relates to painting equipment and the like. More particularly, the disclosure relates to a painting system and accessories which simplifies, expedites, economizes and enhances safety of residential homes and commercial large-scale painting projects such as the painting of buildings and other large structures.

BACKGROUND OF THE INVENTION

Over the past 50 years, considerable innovations in paint coatings, lifts, spray machines, power rollers, wands, respirators, masking film, tapes and other painting equipment and accessories have been made in the painting industry. However, the design of the spray shield today is much as it was 40 years ago. The spray shield may bring four different paint application tools together in one integrated hybrid system: the spray shield itself, the airless spray gun, the advanced brush coupler and components. Therefore, innovation in the design of the spray shield is one of the greatest improvements that can be made to the current industry standard of the spray paint application system. The typical hand held shield prohibits the use of pole guns and longer wands. Because pole guns and longer wand require both hands to use.

The typical conventional paint application system suffers from a number of drawbacks. The conventional paint application system may require that a single painter on a ladder manage two pieces of equipment: the spray gun and the hand-held spray shield. Therefore, the painter may be required to climb, position and manage both pieces of equipment with both hands without maintaining a hold or grasp on the ladder. Moreover, an airless paint spray gun is typically positioned at arm's length about three feet away from the face of the user as paint is sprayed on a surface using the sprayer. At this distance, paint overspray and blowback which may be caused by deflection of the paint by the hand-held spray shield or wand is a normal occurrence. These conditions, especially on a ladder, may be difficult to manage and are often dangerous.

In use of the conventional paint spray application system, a painter tends to extend the arms out with both hands simultaneously working both the spray shield and the spray gun. The painter naturally tries to reach out to paint as much as he or she can on the ladder or plank station on which the painter stands before having to move the ladder or plank station for the next application. Therefore, the conventional paint spray application system may render the painter vulnerable in a number of ways. At full extension, if the painter begins to lose his or her balance, the painter's hands are most likely furthest away from the ladder. Moreover, the painter's hands are most likely grasping the spray gun in one hand and the paint shield in the other hand. An experienced painter may reach out and use the hand-held spray shield as both a shield and a balancing support. Just enough weight is placed on the shield to not flex the shield but hold the painter's bearing or balance while he or she focuses on the spraying. This maneuvering may be stressful and dangerous, particularly for the inexperienced painter.

The conventional spray paint application wand or pole gun is typically used with both hands It is impossible to spray with a pole gun and conventional shield. However, the conventional paint application wand may be limited to a very small area that can be sprayed per ladder or station. The typical wands that are used with the hand held shields are approximately 12 inches to 23 inches long. They do not have a rotating spray head and can only spray straight in the direction which the spray gun is pointed. These wands have limited application because they are short and thus have less range. Also only spraying straight, it is difficult for a painter to use these wands to spray around objects or in tight situations.

An option in use of the conventional paint application system is enlisting the assistance of a helper with support of the paint shield. This support may enable the painter to use a pole or longer paint application wand with both hands. However, the added labor for shield support may be expensive. Although the conventional hand-held shield may be fitted with an extension handle, the handle, without a universal joint, may block the shield from awkward spaces. Thus, the painter's helper may use the handled spray shield on another ladder which is positioned beside the ladder on which the painter stands. This is a highly-inefficient use of labor. Therefore, many experienced painters using conventional systems may lean out to the edge of their comfort zone or tipping point and paint in a dangerous position.

The conventional paint application system may require that a painter be positioned on a roof to paint gutters or eaves on a building. Because roof conditions may vary, roof work may be dangerous for painters. Therefore, roof work for painters may require expensive assistance or even repairs.

Accordingly, a painting system and accessories which simplifies, expedites, economizes and enhances safety of residential and commercial large-scale painting projects such as the painting of buildings and other large structures is needed.

SUMMARY OF THE INVENTION

The disclosure is generally directed to a self-standing spray shield assembly. An illustrative embodiment of the self-standing spray shield assembly includes a spray shield handle, a universal joint carried by the spray shield handle and a spray shield carried by the universal joint.

The disclosure is further generally directed to a spray wand assembly. An illustrative embodiment of the spray wand assembly includes a spray gun, a generally elongated wand shaft disposed in fluid communication with the spray gun and a spray nozzle assembly having a spray head carried by the wand shaft and a spray nozzle pivotally carried by the spray head.

The disclosure is further generally directed to a brush extension assembly. An illustrative embodiment of the brush extension assembly includes a generally elongated extension shaft, an extension assembly coupler carried by the extension shaft and a paint brush carried by the extension assembly coupler and angularly adjustable with respect to the extension shaft.

BRIEF DESCRIPTION OF THE DRAWINGS

The disclosure will now be made, by way of example, with reference to the accompanying drawings, in which:

FIG. 3A is a right side view of an exemplary universal joint which is suitable for implementation of an illustrative embodiment of the spray shield assembly;

FIG. 3B is a top view of the universal joint illustrated in FIG. 3A, coupled to a spray shield handle of the spray shield assembly;

FIG. 3C is a left side view of the universal joint illustrated, in FIG. 3A;

FIG. 15 illustrates exemplary application of an illustrative embodiment of a pair of self-standing hard spray shield assemblies and a self-standing soft spray shield assembly with a spray wand assembly;

FIGS. 16-18 are perspective views illustrating an illustrative embodiment of a brush extension assembly;

FIG. 19 is a perspective view illustrating exemplary application of the brush extension assembly;

FIG. 20 is a perspective view illustrating exemplary application of the brush extension assembly by a painter standing on a ladder.

FIG. 21 is a perspective view of a paint brush of the brush extension assembly as it is held in the hand of a painter;

FIGS. 22-25 are perspective views of various alternative illustrative embodiments of the brush extension assembly;

FIGS. 32-38 are side views of paint brushes and ball screw attachments which are suitable for implementation of the extension assembly coupler illustrated in FIGS. 26-30;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
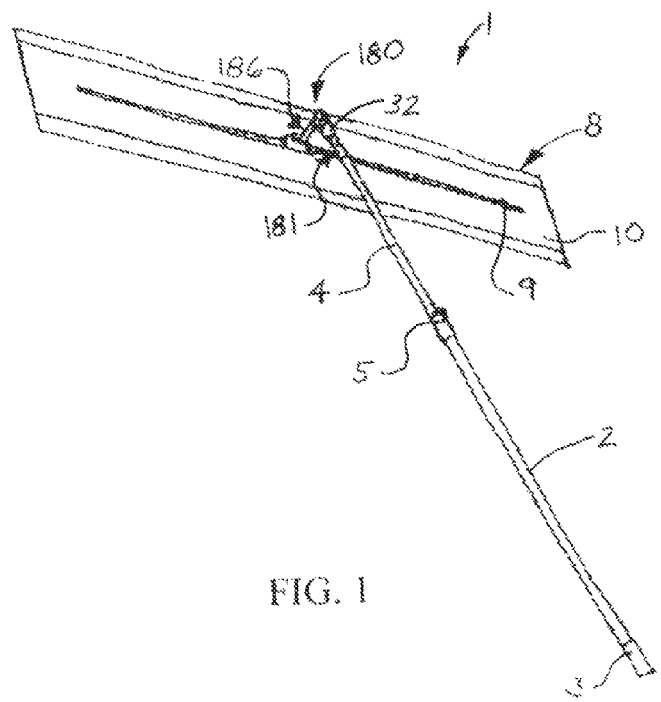
FIG. 1 is a rear perspective view of an illustrative embodiment of a self-standing hard spray shield assembly.

Referring initially to FIGS. 1 and 3A-3D of the drawings, an illustrative embodiment of a self-standing hard spray shield assembly is generally indicated by reference numeral 1 in FIG. 1. The hard spray shield assembly 1 may include a generally elongated spray shield handle 2. The spray shield handle 2 may have an attachment end 3. A handle extension 4 may be telescopically extendable from the end of the spray shield handle 2 which is opposite the attachment end 3. A handle extension lock 5 may be provided on the spray shield handle 2. The handle extension lock 5 may be adapted to engage the handle extension 4 to lock a selected extended length of the handle extension 4 from the spray shield handle 2. The handle extension lock 5 may have any of numerous designs which are known by those skilled in the art and are suitable for the purpose.

A spray shield 8 may be provided on the handle extension 4. In some embodiments, the spray shield 8 may include a generally elongated spray shield frame 9. A universal joint 180, the details of which will be hereinafter described, may attach the spray shield frame 9 of the spray shield 8 to the handle extension 4. A spray shield panel 10 may be supported by the spray shield frame 9. The spray shield panel 10 may be attached to the spray shield frame 9 using fasteners (not illustrated) and/or any other suitable attachment technique known by those skilled in the art. In some embodiments, the spray shield panel 10 of the spray shield 8 may have a generally elongated, rectangular configuration, as shown. The spray shield panel 10 may be plastic, metal and/or other suitable rigid or semi-rigid material which is consistent with the functional requirements of the hard spray shield assembly 1, which will be hereinafter described.

As illustrated in FIGS. 3A-3D, the universal joint 180 may include a generally elongated attachment fitting 181. A coupling 182 may be on a first end of the attachment fitting 181. A socket 183 having a socket opening 183a (FIG. 3D) may be on a second end of the attachment fitting 181. The coupling 182 of the attachment fitting 181 may be adapted for threaded and/or alternative attachment to the handle extension 4 (FIG. 1) of the assembly 1 (FIG. 1).

A joint body 186 may be pivotally attached to the socket 183 of the attachment fitting 181. As illustrated in FIG. 3D, the joint body 186 may include a fitting attachment portion 187 having a bolt opening 188; a shield attachment portion 189 having a shank opening 190; and a connecting portion 191 which connects the shield attachment portion 189 to the fitting attachment portion 187. The shank opening 190 in the shield attachment portion 189 may be oriented in generally perpendicular relationship with respect to the bolt opening 188 in the fitting attachment portion 187. The fitting attachment portion 187 of the joint body 186 may be pivotally attached to the socket 183 of the attachment fitting 181 by extending a flat shank bolt 194 through the socket opening 183a in the socket 183 and the registering bolt opening 188 in the fitting attachment portion 187 of the joint body 186. As illustrated in FIG. 3D, the flat shank bolt 194 may include a generally elongated bolt shank 195 having bolt threads 196.

Flat shank portions 197 may be provided in opposite sides of the bolt shank 195. A square or alternatively-shaped bolt head 198 may be provided on the bolt shank 195. A flat shank washer 200 may be placed on the bolt shank 195 of the flat shank bolt 194. A nut 201 may be threaded on the bolt threads 196 of the bolt shank 195 and tightened against the shank washer 200.

A joint head 204 may be attached to the shield attachment portion 189 of the joint body 186. The joint head 204 may include a female coupling 205. A pin opening 206 may extend transversely through the female coupling 205. The female coupling 205 may have a joint head flange 207. A flat shank 208 may extend from the joint head flange 207. The flat shank 208 may have flat shank threads 209 and a pair of flat shank portions 210. Accordingly, the joint head 204 may be attached to the joint body 186 by extending the flat shank 208 of the joint head 204 through the shank opening 190 in the shield attachment portion 189 and threading a nut 222 flat shank threads 209 of the flat shank 208. A flat shank washer 220 may be sandwiched between shield attachment portion 189 and the nut 222.

The spray shield frame 9 (FIG. 1) of the assembly 1 may be attached to the joint head 204 of the universal joint 180 by extending a joint head bolt 214 (FIG. 3D) through a washer 218 and threading the joint head bolt 214 into the female coupling 205 of the joint head 204. In some applications, a pin 212 may be extended through the pin openings 206 provided in the female coupling 205 and through a registering pin opening 215 in the joint head bolt 214.

Figure 3D:
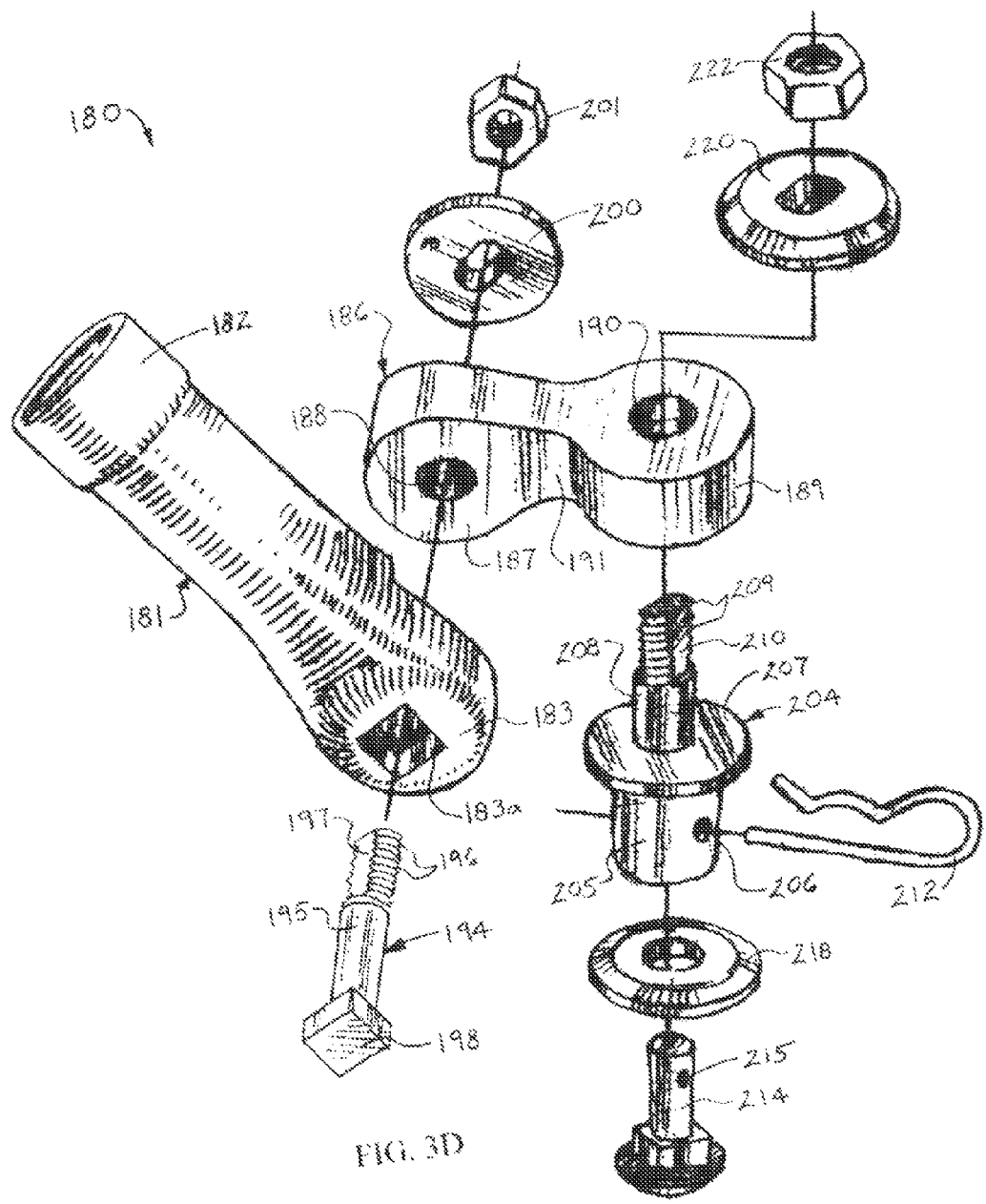
FIG. 3D is an exploded view of the universal joint illustrated in FIG. 3A.
Figures 4, 5, 6:
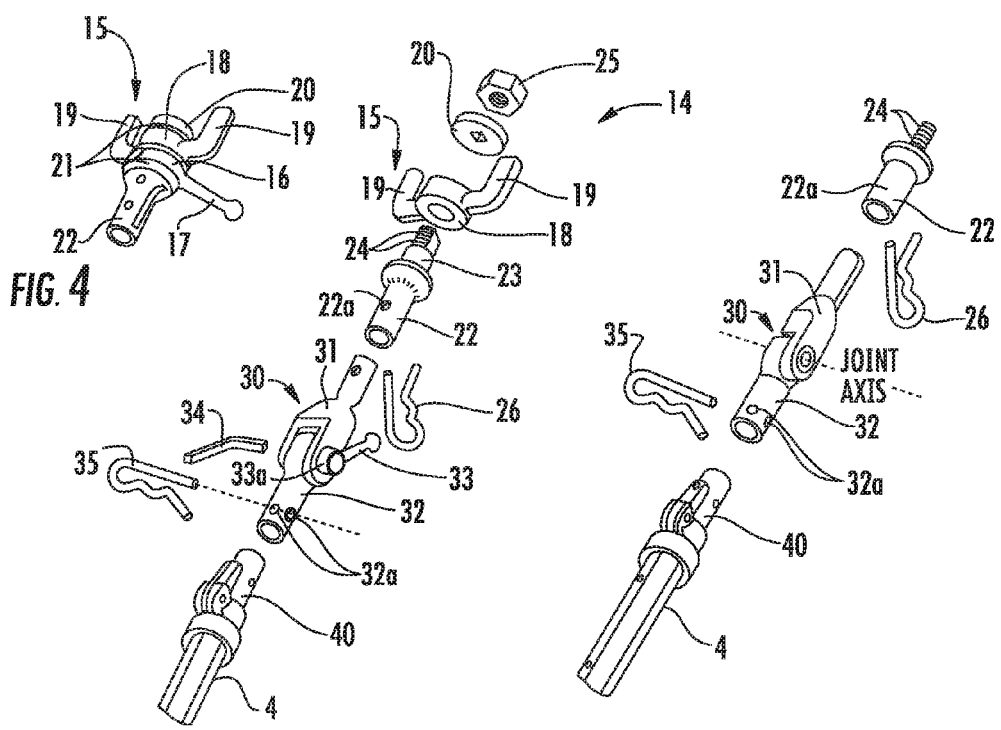
FIG. 4 is a perspective view of a joint head assembly of an alternative illustrative embodiment of a universal joint.
FIGS. 5 and 6 are exploded perspective views of the universal joint illustrated in FIG. 4.

As illustrated in FIGS. 5 and 6, a handle extension fitting 40 may be provided on the end of the handle extension 4 (FIG. 1) of the hard spray shield assembly 1. The handle extension fitting 40 may be sized and configured for insertion into the female coupler fitting 32 of the joint coupler 30. Accordingly, the universal joint 15 may be attached to the handle extension 4 by inserting the handle extension fitting 40 into the female coupler fitting 32 of the joint coupler 30. In some embodiments, a spring clip 35 may be extended through spring clip openings 32a in the female coupler fitting 32 and through registering openings (not illustrated) in the handle extension fitting 40 to secure the handle extension fitting 40 in the female coupler fitting 32 of the joint coupler 30. The spray shield 8 of the hard spray shield assembly 1 may be attached to the universal joint 180 by attaching the spray shield frame 9 (FIG. 1) of the spray shield 8 to the joint head 204 (FIG. 3D) of the universal joint 180 using the joint head bolt 214 and/or any other suitable attachment technique known by those skilled in the art. It will be appreciated by those skilled in the art that the universal joint 180 may be selectively tightened and loosened by tightening or loosening the nut 201 on the flat shank portion 197 of the flat shank bolt 194. Upon tightening of the universal joint 180, the spray shield 8 may be set in a fixed or locked position relative to the handle extension 4. Loosening of the universal joint 180 enables the spray shield 8 to swivel and rotate to any position in relation to the handle extension 4. The assembly 1 may be used with the universal joint 180 set firm enough (not too tight and not too lose) to hold the spray shield 8 in a fixed relation to the handle extension 4. The spray shield 8 may be universally positioned in relation to the handle extension 4 by hand for the next shielding position. Therefore, it may not be necessary for a user to loosen and tighten the flat shank bolt 194 (FIG. 3D) in order to reposition the spray shield 8 in relation to the handle extension 4. This is particularly advantageous since a user may not know the required position of the shield assembly in relation to the handle extension 4 until the assembly 1 is placed in position for painting.

Referring next to FIGS. 4-6 of the drawings, an alternative exemplary design of a universal joint 14 which may be suitable for the hard spray shield assembly 1 is illustrated. The universal joint 14 may include a joint head assembly 15. The joint head assembly 15 may include a generally cylindrical joint body 16. A joint lever 17 may extend from the joint body 16. A generally cylindrical flange segment 18 may be rotatable with respect to the joint body 16. A pair of spaced-apart shield attachment flanges 19 may extend from opposite sides of the flange segment 18. A joint head 20 may be provided on the flange segment 18. Washers 21 may be sandwiched between the joint body 16 and the flange segment 18 and between the flange segment 18 and the joint head 20.

As illustrated in FIG. 5, a female joint head fitting 22 of the universal joint 14 may have spring clip openings 22a. A joint fitting shaft 23 having shaft threads 24 may extend from the female joint head fitting 22. The joint fitting shaft 23 may extend through registering openings (not illustrated) in the joint body 16, the flange segment 18 and the joint head 20. A nut 25 may be threaded on the shaft threads 24 of the joint fitting shaft 23 to secure the joint body 16, the flange segment 18 and the joint head 20 on the joint fitting shaft 23.

A joint coupler 30 of the universal joint 14 may include a male coupler fitting 31 which inserts into the female joint head fitting 20. In some embodiments, the male coupler fitting 31 of the joint coupler 30 may be secured in the female joint head fitting 20 by extending a spring clip 26 through the spring clip openings 22a in the female joint head fitting 22 and through a registering spring clip opening (not numbered) in the male coupler fitting 31. The joint coupler 30 may further include a female coupler fitting 32 which is pivotally attached to the male coupler fitting 31. A bolt 33a may pivotally attach the female coupler fitting 32 to the male coupler fitting 31. A tightening lever 33 may extend from the bolt 33a. The bolt 33a may be selectively rotated to vary the pivotal resistance between the male coupler fitting 31 and the female coupler fitting 32. In some embodiments, an Allen wrench 34 may be used to adjust an Allen screw (not illustrated) which pivotally attaches the male coupler fitting 31 to the male coupler fitting 32.

Figure 2:
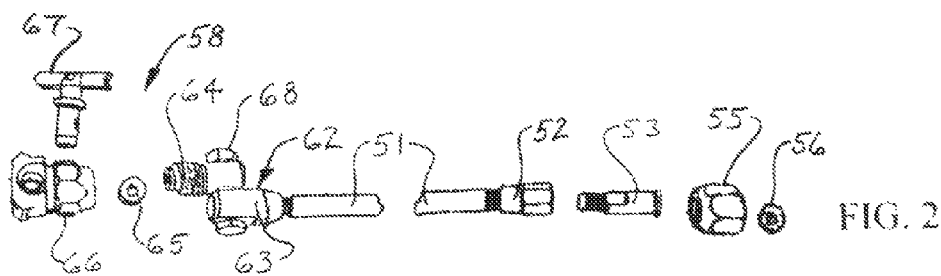
FIGS. 2 and 3 are exploded views, partially in section, of an illustrative embodiment of a spray wand assembly.
Figure 3:
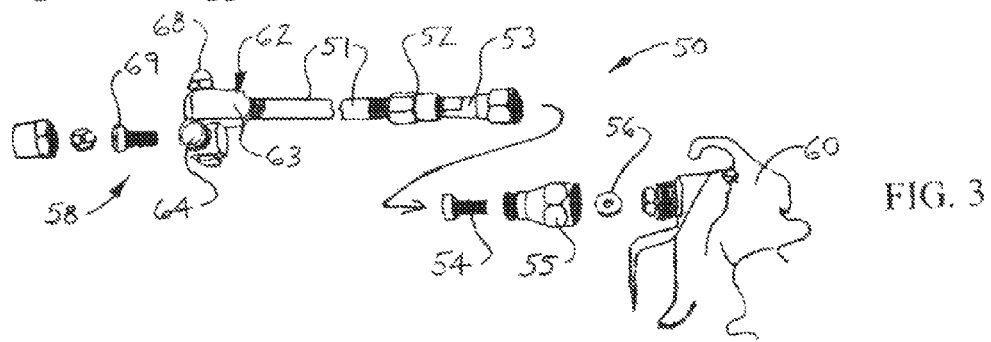

Referring next to FIGS. 2 and 3 of the drawings, an illustrative embodiment of a spray wand assembly is generally indicated by reference numeral 50 in FIG. 3. The spray wand assembly 50 may include a generally elongated wand shaft 51. A handle fitting 52 may be provided on a proximal end of the wand shaft 51. A filter fitting 53 may threadably engage the handle fitting 52. A paint filter 54, which may be conventional, may be seated in the filter fitting 53. A spray gun fitting 55 may threadably engage the filter fitting 53. A paint spray gun 60, which may be conventional, may be threadably attached to the spray gun fitting 55. A sealing O-ring 56 may be sandwiched between the spray gun 60 and the spray gun fitting 55 for sealing purposes.

A spray head 62 may be provided on a distal end of the wand shaft 51. The spray head 62 may include a spray head attachment fitting 63 which threadably engages the wand shaft 51. A spray head nozzle fitting 64 may be provided on the spray head attachment fitting 63. In some embodiments, a spray head bolt 68 may pivotally attach the spray head nozzle fitting 64 to the spray head attachment fitting 63 of the spray head 62. Accordingly, the spray head nozzle fitting 64 may be capable of up to a 360-degree rotation with respect to the spray head fitting 63 about the axis of the spray head bolt 68. A spray head filter 69 may be provided in the spray head nozzle fitting 64.

As illustrated in FIG. 2, a spray nozzle assembly 58 may include a spray nozzle 66 which may be attached to the spray head nozzle fitting 64. A sealing O-ring 65 may be sandwiched between the spray head nozzle fitting 64 and the spray nozzle 66 for sealing purposes. In some embodiments, the spray nozzle 66 may be fitted with a reverse tip 67 which may be rotated to selectively vary the spray intensity of paint (not illustrated) as it is sprayed from the spray head nozzle 66 in use of the spray wand assembly 50, which will be hereinafter described.

Figure 7:
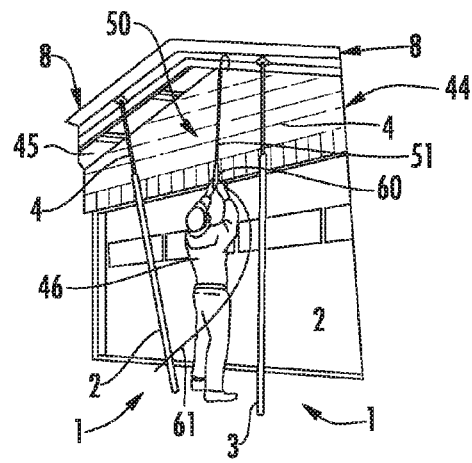
FIGS. 7-12 illustrate various exemplary applications of the self-standing hard spray shield assembly.
Figure 8:
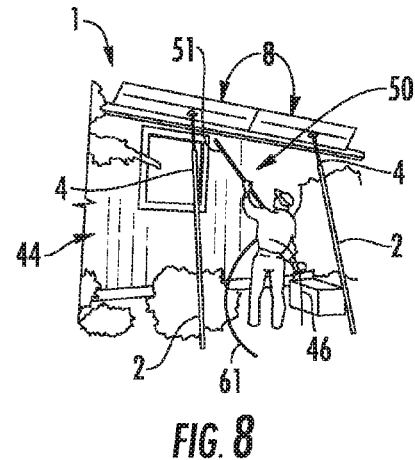
Figure 9:
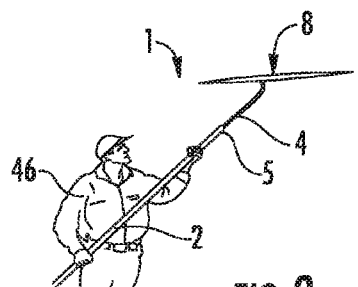
Figure 10:
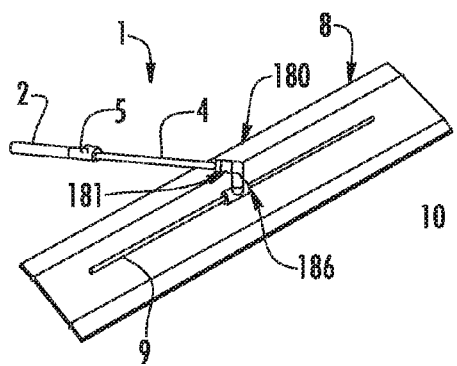
Figure 11:
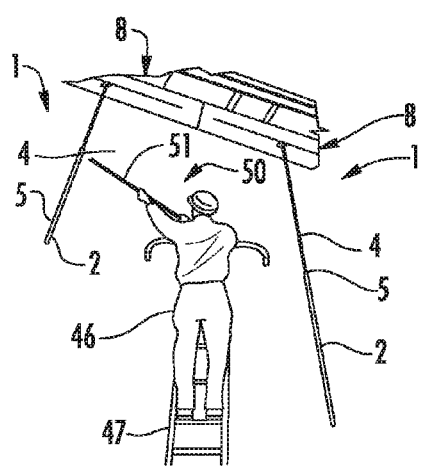
Figure 12:
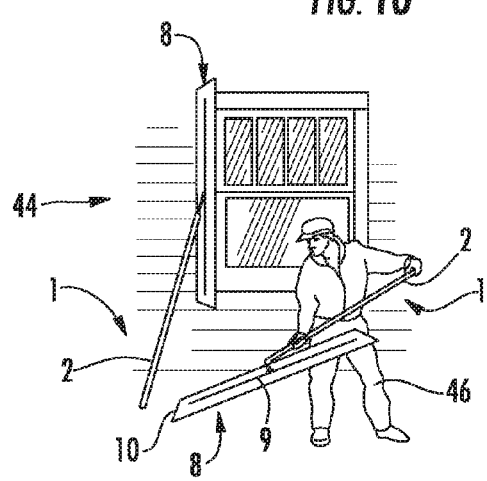

Referring next to FIGS. 7-13 and 46 of the drawings, various possible applications of the hard spray shield assembly 1 and the spray wand assembly 50 in the painting of a structure 44 such as a home or building, for example and without limitation, are illustrated. As illustrated in FIG. 7, one or multiple spray shield assemblies 1 may be deployed in an upright position to shield the roof shingle underside of an eave 45 on the structure 44 during painting of the exterior of the structure 44 using the spray wand assembly 50. Accordingly, the attachment end 3 on the spray shield handle 2 of each hard spray shield assembly 1 may be placed on the ground. The handle extension 4 may be selectively extended from the spray shield handle 2 to facilitate the desired height of the spray shield 8 and locked with respect to the spray shield handle 2 by manipulation of the handle extension lock 5 (FIG. 1). The universal joint 14 (FIG. 1) of each hard spray shield assembly 1 facilitates angular and rotational adjustment of the spray shield 8, enabling the spray shield 8 to be placed against the lower surface of the eave 45 on the structure 44. Therefore, it will be appreciated by those skilled in the art that each hard spray shield assembly 1 is self-standing and does not require the efforts of a painter 46 in maintaining the hard spray shield assemblies 1 in place during painting of the structure 44.

As further illustrated in FIG. 7, a spray gun hose 61 may be coupled to the spray gun 60 (FIG. 3) from which the spray wand assembly 50 extends. The spray gun hose 61 may be connected to a paint reservoir (not illustrated) which contains a supply of liquid paint to be sprayed from the spray nozzle 66 of the spray wand 50. Accordingly, the painter 46 may operate the spray gun 60 with one hand and guide the wand shaft 51 of the spray wand assembly 50 with the other hand during painting of the structure 44. The spray shields 8 of the respective hard spray shield assemblies 1 substantially cover or shield the underside of the eave 45 and prevent the paint which is sprayed from the spray nozzle 66 of the spray wand assembly 50 from being sprayed on the underside of the eave 45. It will be appreciated by those skilled in the art that the angle of the spray nozzle 66 with respect to the exterior surface of the structure 44 may be selectively adjusted by rotating the spray head nozzle fitting 44 with respect to the spray head attachment fitting 63 of the spray head 62. Additional applications of the hard spray shield assembly 1 and the spray wand assembly 50 are illustrated in FIGS. 8-12.

Figure 13:
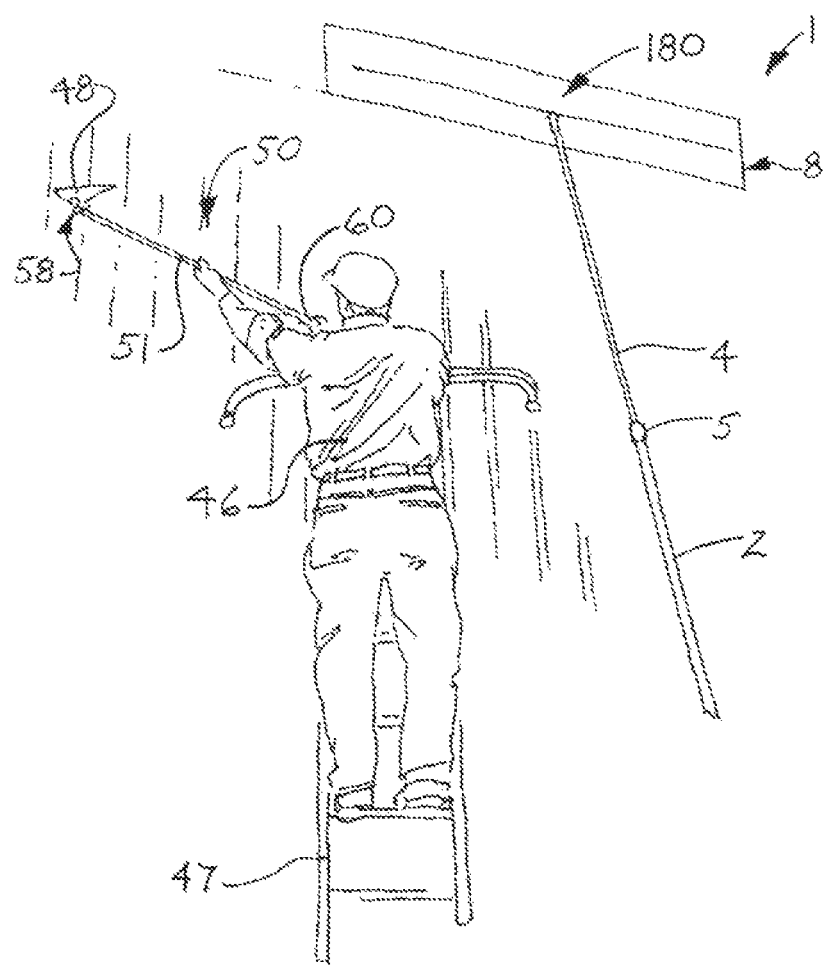
FIG. 13 illustrates exemplary application of a self-standing hard spray shield assembly and a spray wand assembly.
Figure 46:
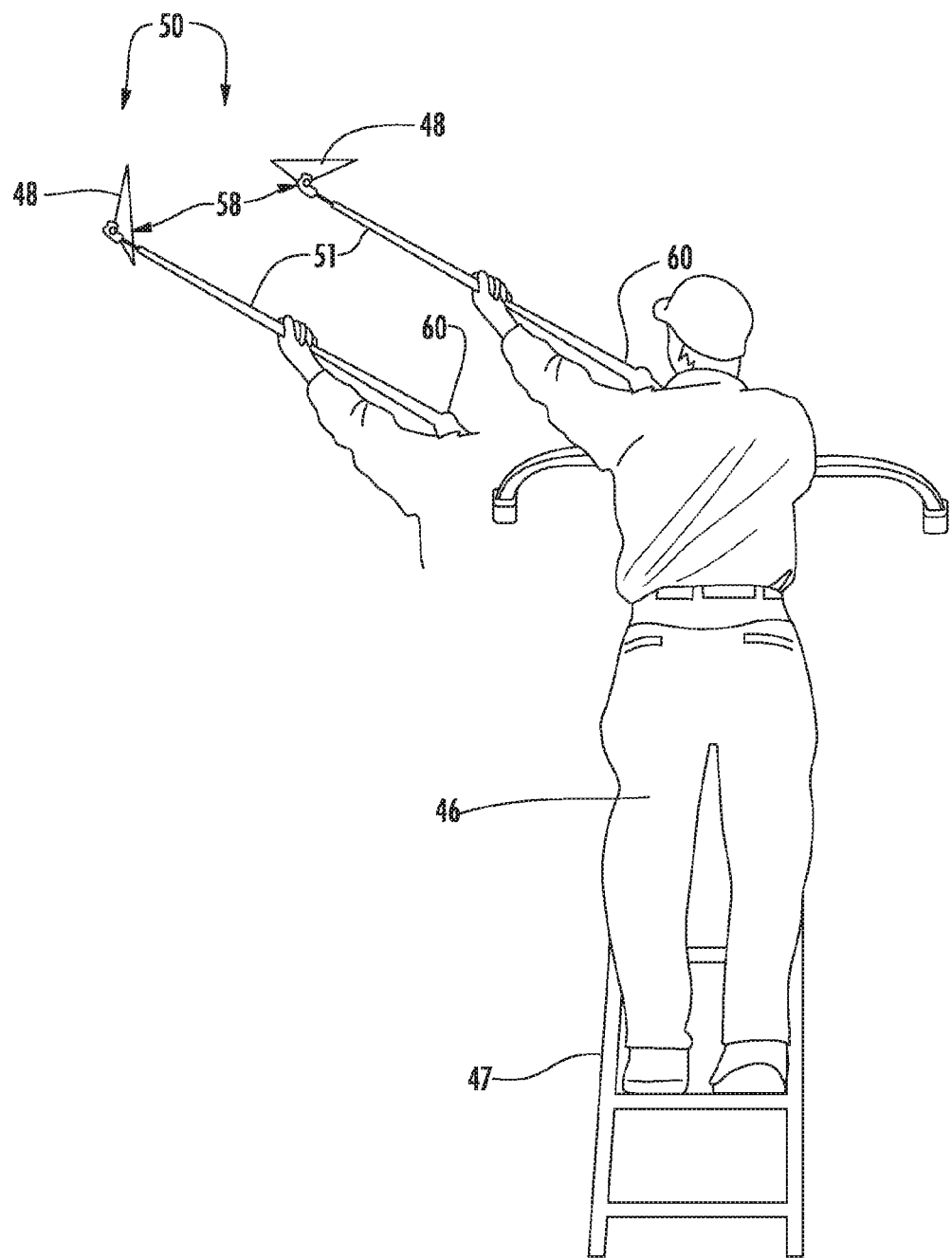
FIG. 46 is a perspective view illustrating exemplary application of a spray wand assembly.

In FIG. 13, the painter 46 is standing on a ladder 47 while operating the spray wand assembly 50 with both hands. A hard spray shield assembly 1 is deployed in a selected position to cover or shield a selected portion of the exterior of the structure 44 from paint 48 as the paint 48 is sprayed from the spray wand assembly 50 against the exterior surface of the structure 44. It will be appreciated by those skilled in the art that due to the self-standing capability of the hard spray shield assembly 1, the painter 46 can devote his or her full effort and attention to operating and guiding the spray wand assembly 50 without the need to additionally handle and position the hard spray shield assembly 1. As illustrated in FIG. 46, it will be appreciated by those skilled in the art that the angle of the spray nozzle 66 with respect to the wand shaft 51 can be selectively adjusted by hand to facilitate uniform coverage of the surface to which the paint 48 is applied.

In some applications, the universal joint 180 may be locked in place. The spray shield 8 of the assembly 1 may be placed on a gutter or overhang (not illustrated) of a structure 44 such that the center of gravity of the assembly 1 is at the lower edge of the spray shield 8. Accordingly, the assembly 1 is balanced on the gutter or overhang without additional support and the spray shield handle 2 extends into the space beneath the gutter or overhang. In other applications, the universal joint 180 may be placed in a self-hanging position on a belly band, eave, window frame or other architectural feature (not illustrated) on the exterior of the structure 44. The end of the spray shield handle 2 may be placed against the exterior wall surface of the structure 44. In this position, the universal joint 180 may be loosened to a firm swiveling position to facilitate adjustments to the position of the assembly 1.

Figure 14:
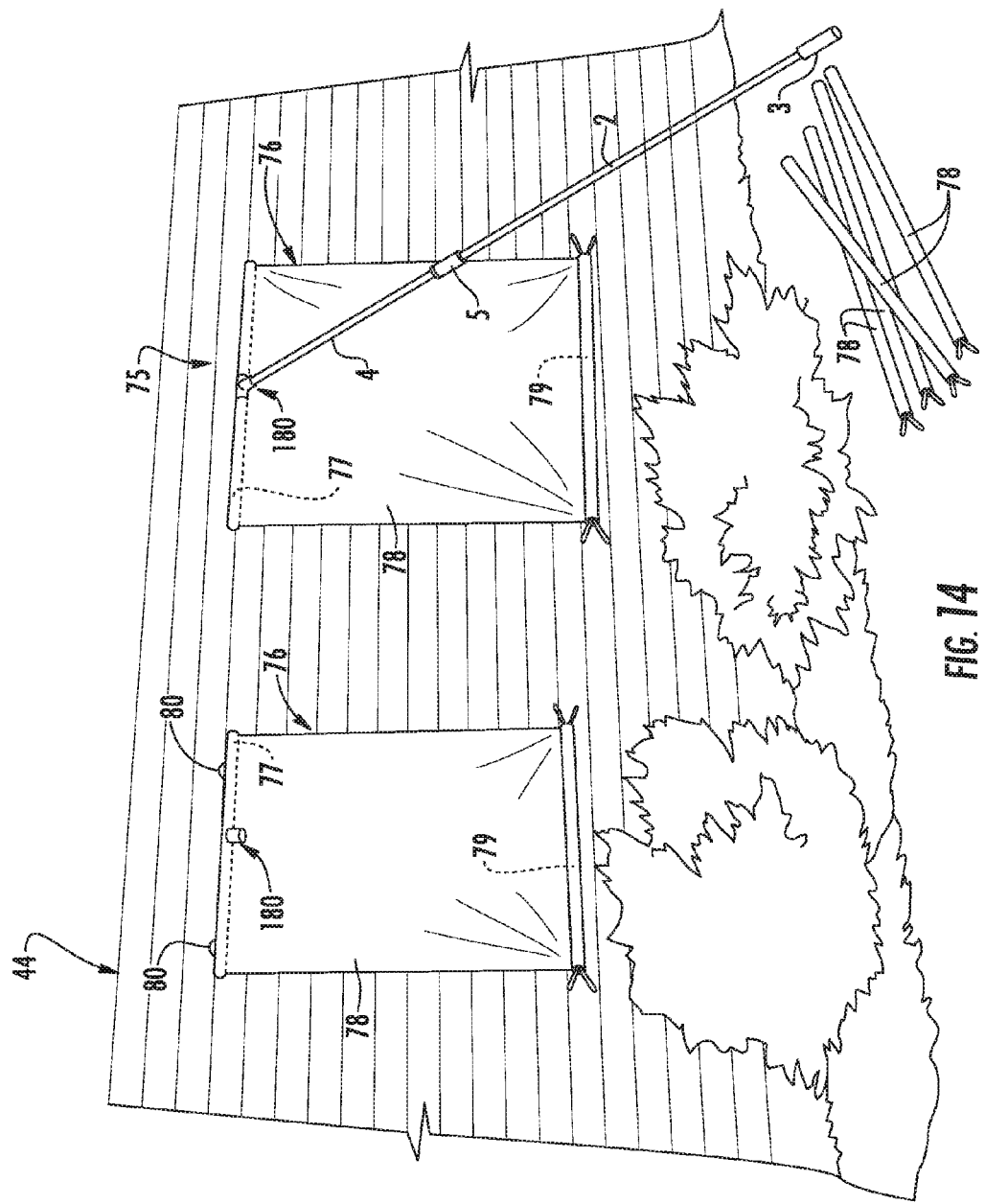
FIG. 14 illustrates exemplary application of an illustrative embodiment of a self-standing soft spray shield assembly.

Referring next to FIGS. 14 and 15 of the drawings, an illustrative embodiment of a self-standing soft spray shield assembly is generally indicated by reference numeral 75. The soft spray shield assembly 75 may include a spray shield handle 2 and a handle extension 4 which is telescopically extendable from the spray shield handle 2, as was heretofore described with respect to the hard spray shield assembly 1. A spray shield 76 may be provided on the handle extension 4. The spray shield 76 may include a generally elongated spray shield frame 77 which may be attached to the joint head 204 (FIG. 3D) of the universal joint 180 such as by using the joint head bolt 214, for example and without limitation. A spray shield panel 78 may be provided on the spray shield frame 77. In some embodiments, the spray shield panel 78 may have a generally elongated, rectangular shape and may be plastic, fabric or other flexible material. The upper edge of the spray shield panel 78 may be attached to the spray shield frame 77 according to the knowledge of those skilled in the art. A generally elongated bottom spray shield member 79 may be attached to the lower edge of the spray shield panel 78 according to the knowledge of those skilled in the art.

As illustrated on the right-hand side of FIG. 14, in exemplary application a self-standing soft spray shield assembly 75 may be deployed in an upright, functional position to cover at least one window (not illustrated) in a structure 44 during painting of the exterior of the structure 44. Accordingly, the attachment end 3 of the spray shield handle 2 may be placed on the ground. The handle extension 4 may be telescopically extended from the spray shield handle 2 to the selected length and locked in place by manipulation of the handle extension lock 5. The spray shield panel 78 of the spray shield 76 may be extended between the bottom spray shield member 79 and the spray shield frame 77 which are positioned generally at upper and lower edges (not illustrated) of the window over which the spray shield panel 78 is placed. Accordingly, the deployed spray shield panel 78 covers or shields the window and prevents paint from falling or being sprayed on the window during painting of the exterior of the structure 44.

As illustrated on the left-hand side of FIG. 14, in applications in which the spray shield handle 2 may hinder painting of the structure 44, the spray shield frame 77 may be attached to the exterior of the structure 44 using hooks 80 or the like to attach the spray shield 76 to the structure 44. The handle extension 4 can be selectively detached from the universal joint 14 on the spray shield 76 to facilitate unhindered painting on all sides of the window which is covered by the spray shield panel 78. As further illustrated in FIG. 14, the spray shield panel 78 may be rolled around the spray shield frame 77 of each soft spray shield assembly 75 for space-efficient storage of the spray shield 76. Soft spray shield assembly 75 may be rolled up or down depending on desired length.

As illustrated in FIG. 15, in some applications, one or multiple self-standing hard spray shield assemblies 1 and one or multiple self-standing hard spray shield assemblies 75 may be deployed on the exterior of the structure 44 to cover or shield windows (not illustrated) and/or other areas on the exterior of the structure 44 during painting of the structure 44 using the spray wand assembly 50. It will be appreciated by those skilled in the art that the self-standing hard spray shield assembly or assemblies 1, in combination with the self-standing soft spray shield assembly or assemblies 75, enable the painter 46 to devote both of his or her hands to operating and maneuvering the spray wand assembly 50.

Figures 39, 40, 41:
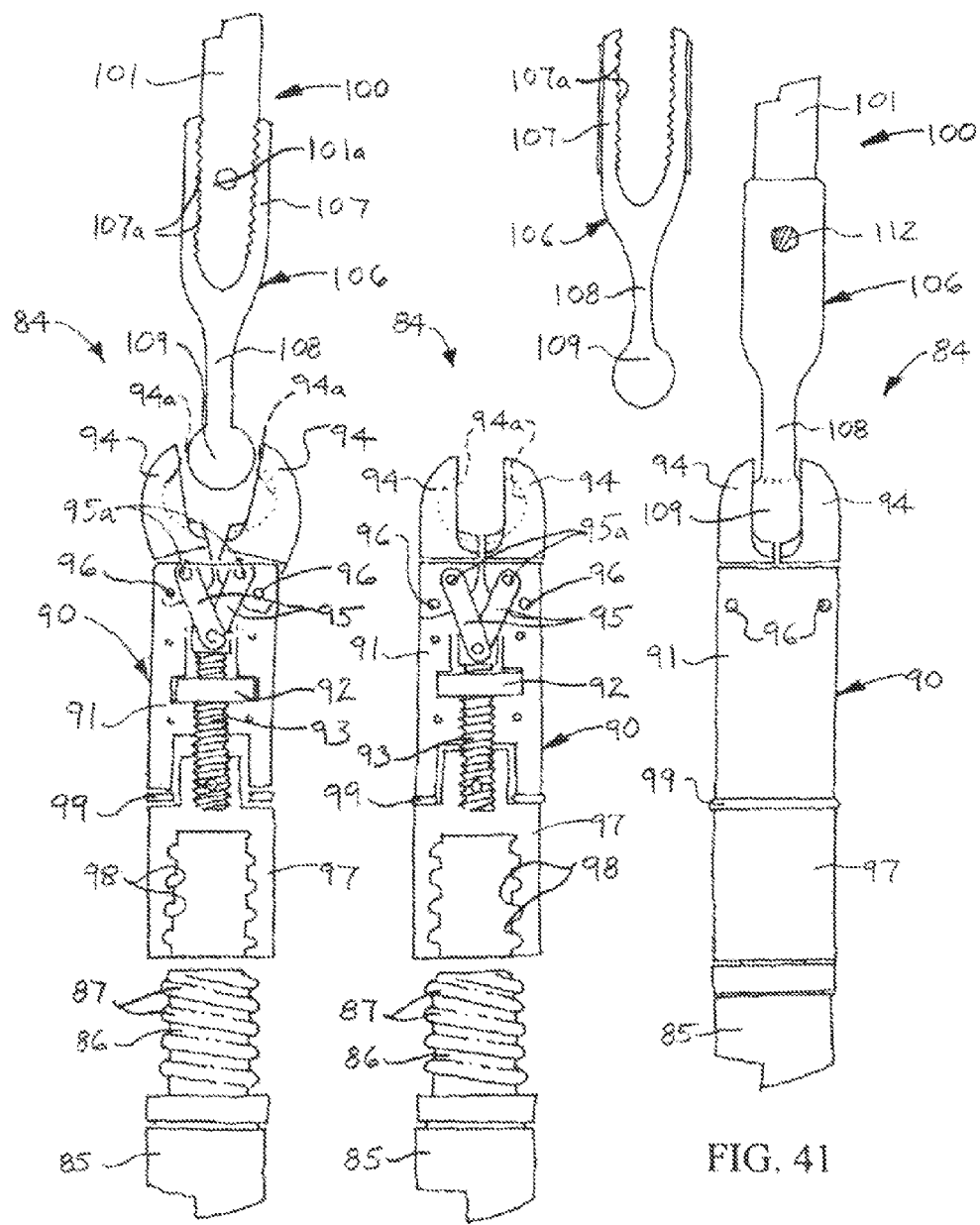
FIGS. 39 and 40 are sectional views of the illustrative embodiment of the brush extension assembly illustrated in FIGS. 16-18.
FIG. 41 is a sectional view of the brush extension assembly illustrated in FIGS. 39 and 40, with a ball screw attachment of a paint brush engaged by a pair of socket jaws of the brush extension assembly.

Referring next to FIGS. 16-21 and 39-41 of the drawings, an illustrative embodiment of a brush extension assembly is generally indicated by reference numeral 84. The brush extension assembly 84 may include a generally elongated extension shaft 85. As illustrated in FIGS. 39 and 40, an extension shaft nipple 86 having exterior nipple threads 87 may be provided on an end of the extension shaft 85. An extension assembly coupler 90 may be provided on the extension shaft 85. The extension assembly coupler 90 may include a coupler housing 91 and an extension shaft socket 97 having interior socket threads 98. The extension shaft socket 97 may be physically separate from the coupler housing 91. A rubber washer 99 may be sandwiched between the coupler housing 91 and the extension shaft socket 97. The extension shaft socket 97 may be sized and configured to receive the extension shaft nipple 86 of the extension shaft 85. The exterior nipple threads 87 on the extension shaft nipple 86 may be adapted to engage the interior socket threads 98 in the extension shaft socket 97 to secure the extension assembly coupler 90 on the extension shaft 85.

A threaded jaw actuation shaft 93 may be anchored in the extension shaft socket 97 and extend through the coupler housing 91. A threaded jaw actuation collar 92 may threadably engage the jaw actuation shaft 93. The coupler housing 91 may rotatably engage the jaw actuation collar 92 such that rotation of the coupler housing 91 rotates the jaw actuation collar 92. Accordingly, as it is manually rotated by a user, the jaw actuation collar 92 may remain stationary in the coupler housing 91 to axially displace the jaw actuation shaft 93 in the coupler housing 91. The jaw actuation shaft 93 may pivotally engage a pair of diverging jaw linkages 95. A pair of opposing socket jaws 94 may be pivotally attached to the coupler housing 91 by a pair of hinge pins 96, respectively. Each of the socket jaws 94 may have a socket 94a which may be generally semispherical in shape. The jaw linkages 95 may pivotally engage the respective socket jaws 94 at linkage pins 95a, respectively. Accordingly, responsive to rotation of the jaw actuation collar 92, the jaw actuation shaft 93 is axially displaced in the coupler housing 91 and actuates the socket jaws 94 between open and closed positions through the jaw linkages 95.

A paint brush 100 may be detachably coupled to the extension assembly coupler 90 of the brush extension assembly 84. The paint brush 100 may include a generally elongated paint brush handle 101. A handle opening 101a may extend through the paint brush handle 101. A paint brush head 102 having paint brush bristles 103 may be provided on a distal end of the paint brush handle 101. A ball screw attachment 106 may be provided on the proximal end of the paint brush handle 101. The ball screw attachment 106 may include an attachment socket 107 having interior socket threads 107a which receives the paint brush handle 101. The interior socket threads 107a in the attachment socket 107 may engage exterior handle threads (not numbered) on the paint brush handle 101. An attachment pin 112 may be extended through socket openings (not illustrated) in the attachment socket 107 and through a registering handle opening 101a provided in the paint brush handle 101. A generally elongated attachment shaft 108 may extend from the attachment socket 107. An attachment ball 109 may be provided on the attachment shaft 108. Accordingly, the paint brush 100 may be attached to the brush extension assembly 84 by opening the socket jaws 94 via rotation of the jaw actuation collar 92, as illustrated in FIG. 39; inserting the attachment ball 109 of the ball screw attachment 106 in the sockets 94a of the socket jaws 94; and then closing the socket jaws 94 by reverse rotation of the jaw actuation collar 92, as illustrated in FIG. 41.

As illustrated in FIGS. 19-21, in exemplary application of the brush extension assembly 84, a painter 115 grasps the extension shaft 85 with his or her hands 116. The orientation of the paint brush 100 with respect to the extension shaft 85 may be adjusted as the ball screw attachment 106 is pivoted in the socket jaws 94. The socket jaws 94 may be tightened against the attachment ball 109 of the ball screw attachment 106 to secure the paint brush 100 at a selected orientation or angle with respect to the extension shaft 85 by rotation of the jaw actuation collar 92 (FIG. 39). After the paint brush bristles 103 are dipped in paint (not illustrated), the paint brush 100 is applied against a surface to be painted (not illustrated). As illustrated in FIG. 19, the extension shaft 85 considerably extends the reach of the painter 115 and increases the surface area which can be painted. In FIG. 20, the painter 115 stands on a ladder 120 and dips the paint brush bristles 103 in a bucket 121 which contains liquid paint (not illustrated). In FIG. 21, the paint brush 100 is detached from the extension assembly coupler 90 and the paint brush handle 101 is grasped by a hand 116 of the painter 115 without use of the extension shaft 85.

Referring next to FIGS. 22, 23 and 25 of the drawings, various alternative illustrative embodiments for the brush extension assembly are illustrated. As illustrated in FIG. 22, in some embodiments the brush extension assembly 124 may include an extension assembly coupler 125 having a coupler housing 126. An internally-threaded extension shaft socket 129 may extend from the coupler housing 126. A pair of socket jaws 127 may pivotally engage the coupler housing 126. A lever-actuated tension adjustment mechanism 128 may be provided in the coupler housing 126. The lever-actuated tension adjustment mechanism 128 may operably engage the socket jaws 127 such that actuation of the lever-actuated tension adjustment mechanism 128 facilitates opening and closing of the socket jaws 127. Accordingly, in attachment of the extension assembly coupler 125 to the extension shaft 85, the extension shaft socket 129 may be adapted to receive the threaded extension shaft nipple 86 of the extension shaft 85. The socket jaws 127 may be adapted to receive and engage the attachment ball 109 (FIG. 16) on the ball screw attachment 106 of the paint brush 100, as was heretofore described with respect to the brush extension assembly 84 in FIGS. 16-18 and 39-41 and which is illustrated in FIG. 23. The tightness of the attachment ball 109 in the socket jaws 127 may be selectively adjusted by manipulation of the tension adjustment mechanism 128.

As illustrated in FIG. 25, in some embodiments the brush extension assembly 133 may include an extension assembly coupler 144 having an extension shaft socket 147 which is adapted to receive the extension shaft nipple 86 of the extension shaft 85. A brush socket 145 may be provided on the extension shaft socket 147. The socket 145 may be fitted with a socket bolt 146. The socket 145 may be sized and configured to receive a proximal end of the paint brush handle 101 of a paint brush 100. The socket bolt 146 may be extended through a handle opening 101a provided in the paint brush handle 101. The socket bolt 146 may be rotated to selectively tighten or loosen the paint brush handle 101 in the brush socket 145. Accordingly, the socket bolt 146 may be loosened to facilitate placement of the paint brush handle 101 at a selected angle with respect to the extension shaft socket 147. The socket bolt 146 may be selectively tightened to secure the paint brush handle 101 at the selected angle with respect to the extension shaft socket 147.

Figures 26, 27, 28, 29, 30, 31:
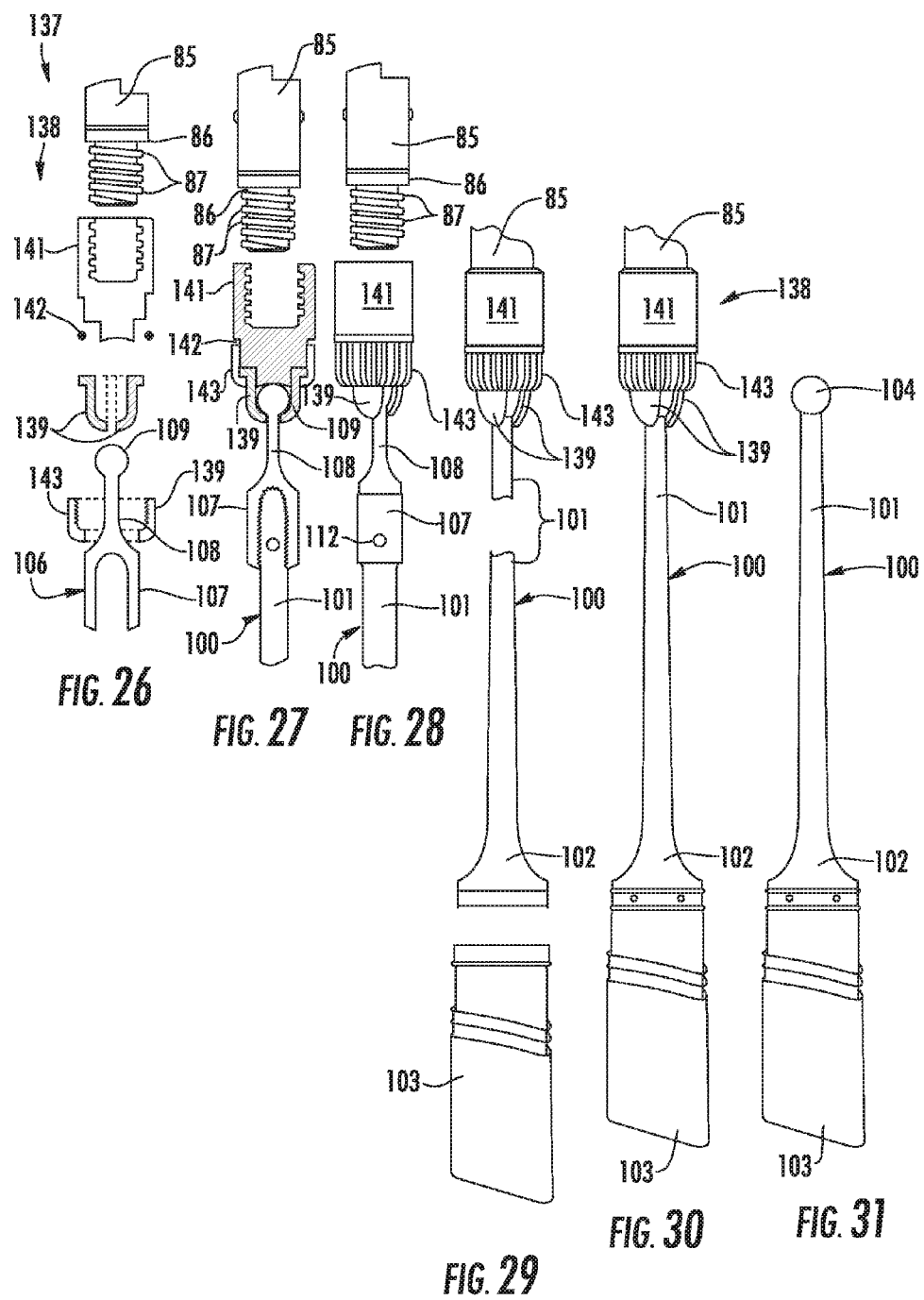
FIGS. 26-28 are exploded views, partially in section, of an illustrative embodiment of an extension assembly coupler suitable for implementation of the brush extension assembly.
FIGS. 29 and 30 are sectional views of a paint brush engaged by an extension assembly coupler.
FIG. 31 is a side view of a paint brush which is suitable for application of the extension assembly coupler illustrated in FIGS. 26-30.

Referring next to FIGS. 24 and 26-31 of the drawings, in some embodiments the brush extension assembly 137 may include an extension assembly coupler 138 having an interiorly-threaded extension shaft socket 141. The extension shaft socket 141 may be adapted to receive and engage the extension shaft nipple 86 on the extension shaft 85. As illustrated in FIG. 27, a twist collar 143 may threadably engage the exterior surface of the extension shaft socket 141. A pair of socket jaws 139 may be engaged between the extension shaft socket 141 and the twist collar 143. The socket jaws 139 may be adapted to receive the attachment ball 109 on the ball screw attachment 106, as illustrated in FIGS. 27 and 28. A rubber washer 142 may be sandwiched between the extension shaft socket 141 and the twist collar 143. Accordingly, upon rotation of the twist collar 143 on the exteriorly-threaded portion of the extension shaft socket 141, the socket jaws 139 are opened and closed and loosened or tightened against the attachment ball 109 on the ball screw attachment 106. In some embodiments, an attachment pin 112 may be extended through registering openings (not illustrated) in the attachment socket 107 of the ball screw attachment 106 and the paint brush handle 101 of the paint brush 100 to further secure the paint brush 100 to the ball screw attachment 106. As illustrated in FIGS. 29-31, in some embodiments a handle ball 104 may be provided in the proximal end of the paint brush handle 101. The socket jaws 139 of the extension assembly coupler 138 may receive the handle ball 104 to secure the paint brush 100 to the extension assembly coupler 138.

Referring next to FIGS. 32-38, various paint brush configurations 100 which are suitable for implementation of the various embodiments of the brush extension assembly are illustrated. In FIGS. 32 and 33, in some embodiments a ball screw attachment 110 may include a pair of spaced-apart attachment flanges 111 which receive the proximal end of the paint brush handle 101. An attachment pin 112 may extend through registering pin openings (not illustrated) in the attachment flanges 111 and the paint brush handle 101 to pivotally attach the paint brush handle 101 to the ball screw attachment 110. An attachment ball 113 may be provided in the ball screw attachment 110. Accordingly, the jaws of each brush extension assembly may be adapted to receive the attachment ball 113 of the ball screw attachment 110 to secure the paint brush 100 to the brush extension assembly.

As illustrated in FIGS. 34 and 35, in some embodiments a handle ball 104 may be provided in the proximal end of the paint brush handle 101. The jaws of each brush extension assembly may be adapted to receive the attachment ball 104 of the paint brush handle 101 to secure the paint brush 100 to the brush extension assembly, such as was heretofore described with respect to FIGS. 29-31.

As illustrated in FIGS. 36-38, in some embodiments the paint brush 100 may include a ball screw attachment 106 having an attachment socket 107 which receives the proximal end of the paint brush handle 101. As illustrated in FIG. 37, in some embodiments the attachment socket 107 may have interior socket threads 107a which engage exterior handle threads (not illustrated) on the paint brush handle 101. In some embodiments, an attachment pin 112 may be extended through a socket opening 107b which is provided in the attachment socket 107 and a registering handle opening 101a which is provided in the paint brush handle 101. An attachment ball 109 may be provided on the attachment shaft 108 of the ball screw attachment 106. The jaws of each brush extension assembly may be adapted to receive the attachment ball 109 of the ball screw attachment 106 to secure the paint brush 100 to the brush extension assembly, such as was heretofore described with respect to FIGS. 39-41.

Figure 42:
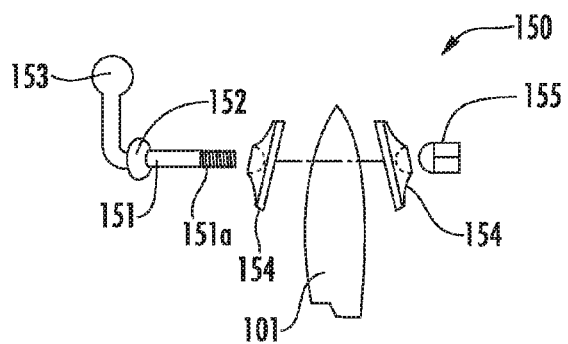
FIGS. 42-45 illustrate an illustrative embodiment of a ball attachment for thick brushes and other tools.
Figure 43:
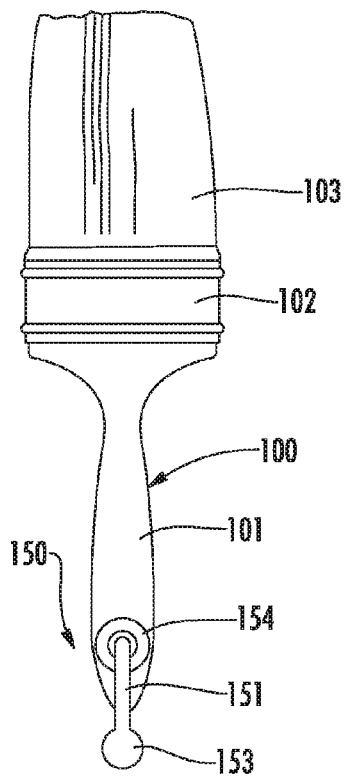
Figure 44:
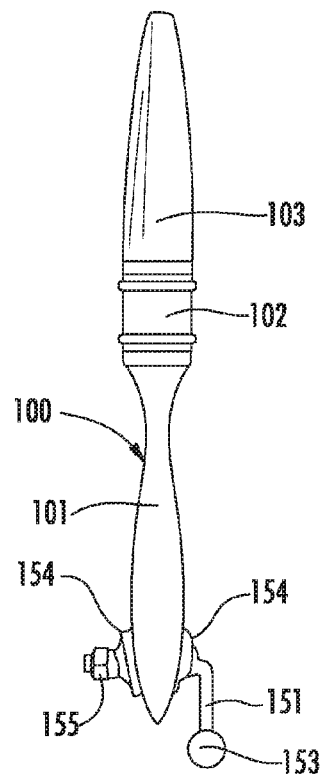

Referring next to FIGS. 42-44 of the drawings, an alternative illustrative embodiment of a ball screw attachment which can be used to couple a paint brush 100 to any of the various embodiments of the brush extension assembly is generally indicated by reference numeral 150. The ball screw attachment 150 may include a generally elongated, L-shaped coupler shaft 151. A coupler shaft flange 152 may be provided on the coupler shaft 151 generally adjacent to the bend of the coupler shaft 151. Shaft threads 151a may be provided at a proximal end of the coupler shaft 151. An attachment ball 153 may terminate a distal end of the coupler shaft 151. The coupler shaft 151 may be extended through a brush opening (not illustrated) in the brush handle 101 of the paint brush 100. The coupler shaft 151 may additionally extend through a pair of base flanges 154 which engage opposite sides of the paint brush handle 101. A nut 155 may be threaded on the shaft threads 151a and tightened against one of the base flanges 154. The jaws of each brush extension assembly may be adapted to receive the attachment ball 153 of the ball screw attachment 150 to secure the paint brush 100 to the brush extension assembly, such as was heretofore described with respect to FIGS. 39-41.

Figure 45:
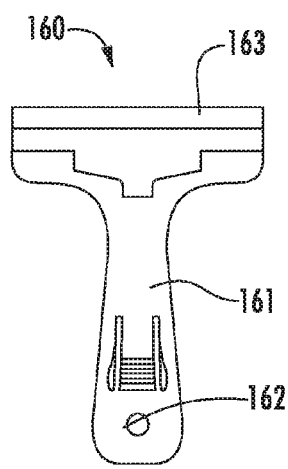

Referring next to FIG. 45 of the drawings, a razor which is suitable for implementation of any of the various embodiments of a brush extension assembly is generally indicated by reference numeral 160. The razor 160 may include a generally elongated handle portion 161 having a handle opening 162. A blade 163 may be oriented generally perpendicular to the handle portion 161. The ball screw attachment 150 (FIGS. 42-44) may be attached to the razor 160 by extending the coupler shaft 151 through the handle opening 162 in the handle portion 161 and threading the nut 155 (FIG. 42) on the shaft threads 151a of the coupler shaft 151. The razor 160 may be attached to any of the various embodiments of the brush extension assembly by engagement of the jaws of the brush extension assembly with the attachment ball 153 of the ball screw attachment 160.

While the preferred embodiments of the disclosure have been described above, it will be recognized and understood that various modifications can be made in the disclosure and the appended claims are intended to cover all such modifications which may fall within the spirit and scope of the disclosure.

What is claimed is:
1. A spray shield assembly, comprising:
a spray shield handle;
a handle extension telescopically extendable from the spray shield handle;
a universal joint, carried by the spray shield handle, comprising an attachment fitting carried by the handle extension, a joint body pivotally carried by the attachment fitting and a joint head carried by the joint body, the joint head comprising a female coupling carried by the handle extension and a flat shank having flat shank threads carried by the female coupling and carried by the joint body; and a spray shield carried by the universal joint;

wherein the attachment fitting comprises a coupling and a socket having a socket opening spaced-apart from the coupling, and wherein the joint body is carried by the socket and comprises a fitting attachment portion, a shield attachment portion and a connecting portion connecting the fitting attachment portion and the shield attachment portion, and wherein the attachment fitting is carried by the fitting attachment portion and the joint head is carried by the shield attachment portion, further comprising a bolt opening in the fitting attachment portion, a bolt extending through the socket opening and the bolt opening and a shank opening in the shield attachment portion and wherein the flat shank of the joint head extends through the shank opening.

2. The spray shield assembly of claim 1 wherein the shank opening is oriented in perpendicular relationship with respect to the bolt opening.

3. The spray shield assembly of claim 1 wherein the spray shield comprises a spray shield frame carried by the joint head; a generally elongated, rectangular, soft spray shield panel carried by the spray shield frame; and a bottom spray shield member carried by the soft spray shield panel.

* * * * *